June 9, 1942.  J. N. SHARMA  2,285,841
APPARATUS FOR TREATING FRUIT
Original Filed May 31, 1939   3 Sheets-Sheet 2
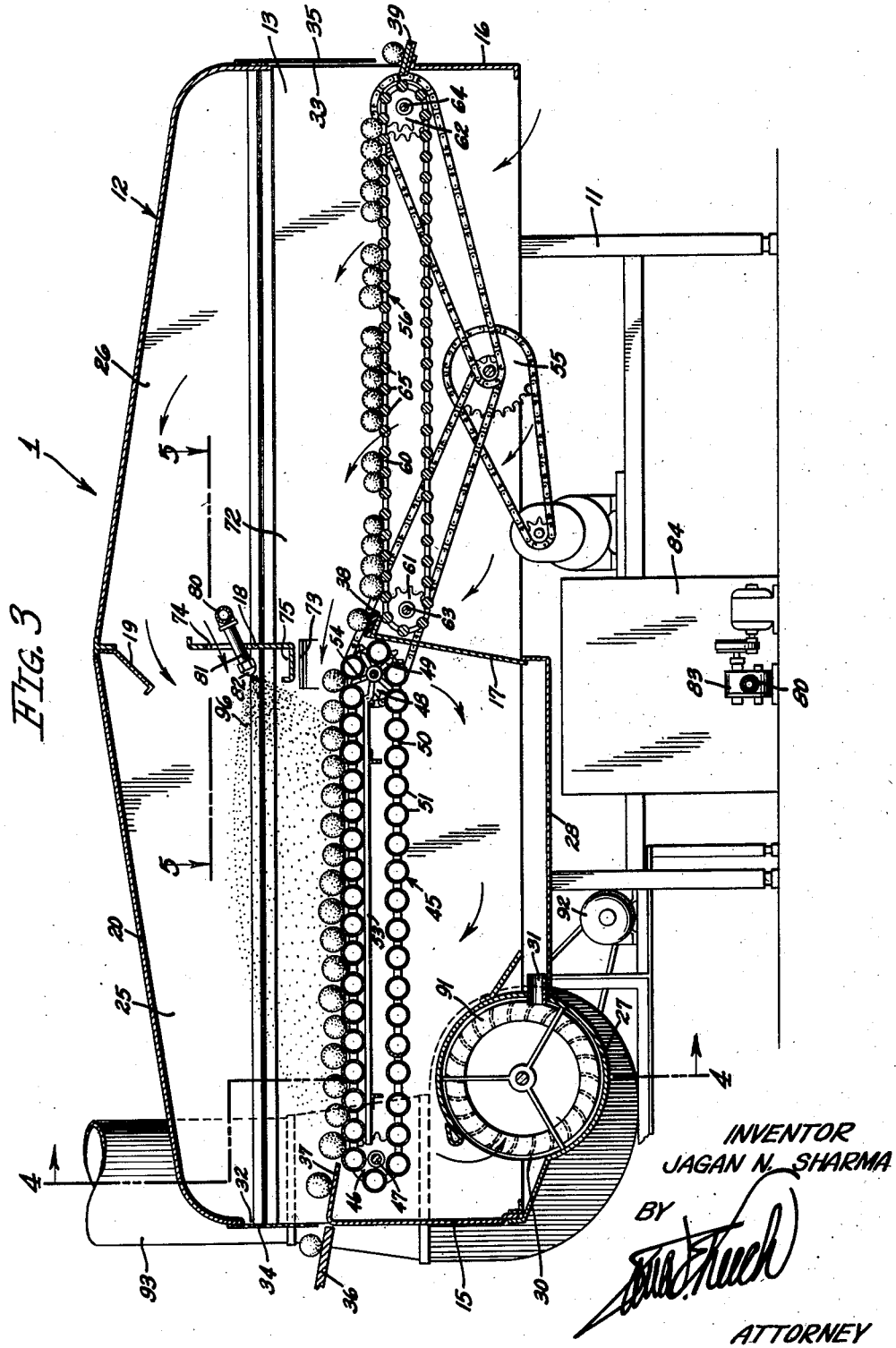
INVENTOR
JAGAN N. SHARMA
BY
ATTORNEY June 9, 1942.  J. N. SHARMA  2,285,841
APPARATUS FOR TREATING FRUIT
Original Filed May 31, 1939  3 Sheets-Sheet 3
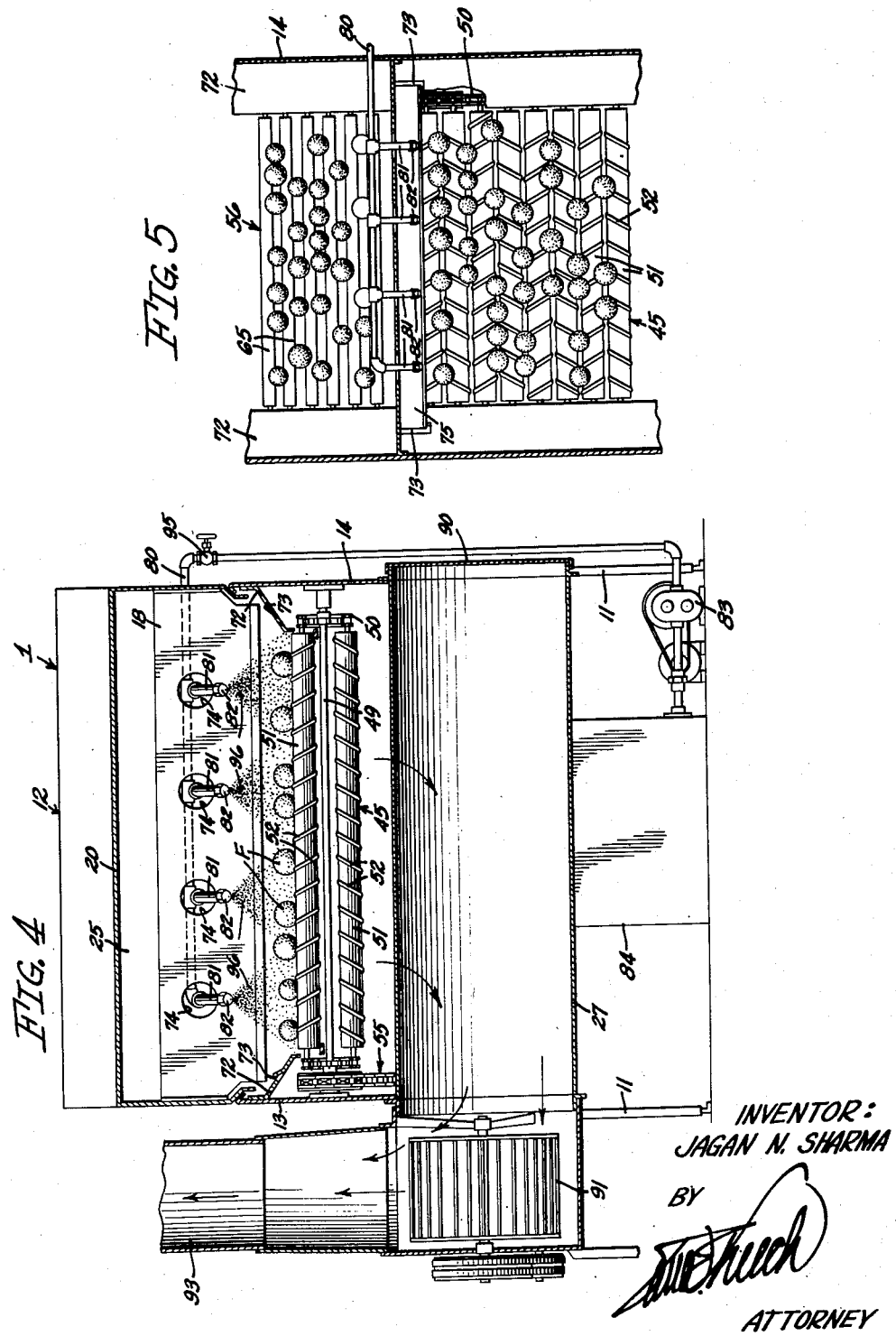

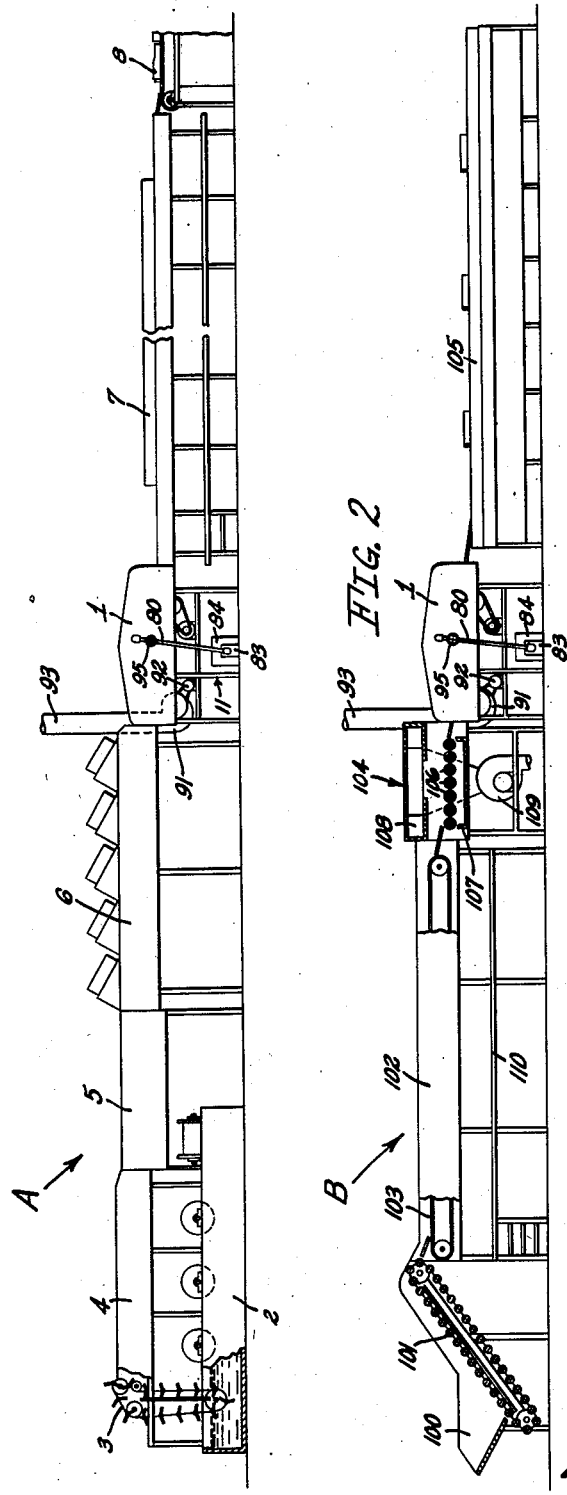

Patented June 9, 1942

2,285,841

UNITED STATES PATENT OFFICE 2,285,841

APPARATUS FOR TREATING FRUIT

Jagan N. Sharma, Los Angeles, Calif., assignor to Food Machinery Corporation, San Jose, Calif., a corporation of Delaware Original application May 31, 1939, Serial No. 276,599. Divided and this application April 29, 1940, Serial No. 332,241

7 Claims. (Cl. 91—44)

This invention relates to an apparatus for applying a treating agent in liquid form relatively uniformly and in minute quantities to the external surfaces of fresh whole fruit. The subject matter covered by this application is carved out of my copending application for U. S. Letters Patent on Process and apparatus for treating fruits, Serial No. 276,599, filed May 31, 1939.

The apparatus of the present invention is especially useful in performing the process disclosed in said copending application, in which a waxy material dissolved in a volatile solvent must be applied to the fruit being treated in such finely divided form and in such minute quantities as to have no injurious burning or leaching action on the fruit, yet produce in such fruit by such treatment a relatively high resistance to shrinkage during the marketing of the fruit. The apparatus of the present invention will accordingly be described in connection with its performing the aforesaid process, although it is to be understood that this apparatus possesses a broader utility extending to the performance of any process requiring the uniform application of a light, liquid material in extremely minute quantities, to the external surfaces of rotatable objects such as citrus fruits.

It is an object of the present invention to provide an improved apparatus for the application of light liquid treating material in finely divided form to fresh whole fruit.

It is another object of this invention to provide such an apparatus which will uniformly apply such a light treating liquid to fresh whole fruit in such small quantities that there is substantially no dripping of such liquid from said fruit.

It is still another object of the present invention to provide an apparatus for applying a light treating liquid as aforesaid to fresh whole fruit so that the liquid thus applied will remain in situ on the fruit as it has been applied, without the necessity for spreading such liquid over the surface of the fruit after it has been so applied, nor the necessity of removing any portion of liquid so applied otherwise than by evaporation of volatiles contained therein.

It is yet another object of the invention to provide such an apparatus for treating fruit as aforesaid in which a volatile treating liquid is atomized into fine particles which are carried directly into contact with the surfaces of said fruit by controlled air currents.

It is yet another object of this invention to provide an apparatus for uniformly applying a light volatile liquid treating material to fresh whole fruit to cause said treating material to remain in situ, without the necessity of distributing said material over said fruit after being so applied, and then evaporating volatiles from the minute particles of treating material so applied to said fruit while said fruit is still in said apparatus.

Another object of this invention is to provide such an apparatus which can be used in the uniform application, in finely atomized form of a volatile treating liquid having a unitary air evacuation system for evacuating volatile fumes created by the treating process and by said evacuation set up currents of air for distributing the atomized particles of treating liquid over the surface of the fruit and then evaporating the volatiles from said treating liquid thus applied to said fruit.

The manner of accomplishing the foregoing objects as well as further objects and advantages will be made manifest in the following description taken in connection with the accompanying drawings, in which:

Fig. 1 is a diagrammatic side elevational view illustrating a form of apparatus especially adapted for the treatment of citrus fruit.

Fig. 2 is a diagrammatic side elevational view illustrating a form of apparatus especially adapted for the treatment of cantaloupes.

Fig. 3 is an enlarged longitudinal sectional view of a preferred embodiment of the apparatus of the present invention which is common to Figs. 1 and 2.

Fig. 4 is a sectional view taken on the line 4—4 of Fig. 3.

Fig. 5 is a fragmentary sectional view taken on the line 5—5 of Fig. 3.

Referring to the drawings, and particularly to Fig. 1, the apparatus is illustrated as comprising a soaking tank 2, from which the fruit to be treated is passed by a loose fruit elevator 3 through a washer 4, water eliminator 5, and drier 6 to the waxer 1. From the waxer 1 the fruit is passed to a sorting table 7 and sizer 8.

Aside from the particular form of waxer 1, the remainder of the equipment may be of any usual or preferred form used in the art for the purpose of washing and drying the fruit previous to the waxing operations or for the purpose of sorting and sizing the fruit after the waxing operations. In the marketing of citrus fruit, it is generally found necessary to first wash from the fruit the dust and scale which the fruit accumulates in the groves. This washing and cleaning of the fruit somewhat lessens its resistance to shrinkage and to an extent also dulls the appearance of the fruit. The appearance of the fruit is to some degree restored by the action of the usual brushes (not shown) in the drier 6 of the apparatus, but the fruit leaving such washing and drying apparatus is particularly adapted to treatment by the apparatus of the present invention for the enhancement of its appearance and improvement of its shrinkage rate.

The waxer 1 includes a frame 11 supporting a housing 12, the latter having side walls 13 and 14, end walls 15 and 16, and an intermediate partition 17. The housing 12 also includes a partition 18 and draft deflecting wall 19, which are disposed directly above the partition 17 and joined at their opposite ends with the walls 13 and 14. The housing 12 also includes a roof 20.

The space within the housing is divided into two chambers 25 and 26 by the partitions 17 and 18 and the baffle wall 19. Connecting with the lower edges of the walls 13, 14, and 15 is a substantially cylindrical air conduit 27, this conduit uniting with a pan 28 to cover the bottom of chamber 25. The conduit 27 has a mouth 30 for admitting air into the conduit from the lower left hand corner of the chamber 25, as shown in Fig. 3. For a purpose which will be made clear hereinafter, the pan 28 is connected with the interior of the conduit 27 by a short pipe 31.

The end walls 15 and 16 are provided with inlet and outlet openings 32 and 33, which are preferably covered with flexible drapes 34 and 35. Fruit is adapted to be fed past the drape 34 and through the inlet opening 32 from a runway 36, this fruit passing onto a runway 37 formed on the wall 15. The upper edge of partition 17 is provided with a drop board 38 and the wall 16 along the lower edge of the discharge opening 33 has a dropboard 39.

Supported between the side walls 13 and 14 in the chamber 25, so as to divide this into upper and lower portions, is a waxing conveyor 45. This conveyor receives fruit from the runway 37 and delivers it onto the drop board 38. The conveyor 45 includes sprockets 46 on a shaft 47 and sprockets 48 on a shaft 49, these shafts journaling in suitable bearings provided on the side walls. Trained about these sprockets are endless chains 50. Suspended at their opposite ends from these chains is an endless series of freely rotatable rollers 51. As shown in Figs. 4 and 5, each of these rollers is provided with a thread 52 formed by a piece of strip material coiled about the roller and secured thereto, these threads in adjacent rollers being pitched in opposite directions. The rollers 51 in the upper flight of the conveyor 45 are supported at their opposite ends upon stationary tracks 53 so as to cause the rollers resting thereon to rotate.

Surrounding the shaft 49 is a spider 54 for dislodging fruit from valleys between adjacent rollers 51 as these rollers travel about the shaft 49. The sprockets 48 are fixed upon the shaft 49 and the latter is driven by a sprocket and chain connection with a suitable power mechanism 55 provided on the frame 11.

Disposed within the chamber 26 so as to receive fruit from the drop board 38 and deliver it onto the drop board 39 is a drying conveyor 56, this conveyor including endless chains 60 trained about pairs of sprockets 61 and 62 mounted on shafts 63 and 64. Supported at their opposite ends by the chains 60 is an endless series of cross bars 65. The conveyor 56 is continuously driven by a suitable sprocket and chain connection between the shaft 64 and the power mechanism 55.

Mounted on the inner faces of the side walls 13 and 14 and sloping downwardly into proximity with the edges of the conveyors 45 and 56 are fruit guard aprons 72. Just below the partition 18 these guards have drip openings 73.

The partition 18 has a series of openings 74 provided therein, there being four of these in the preferred embodiment shown. The lower edge of this partition is bent to form a drip trough 75, the opposite ends of which are positioned to discharge drippings collected in this trough downwardly through the openings 73 in the guards 72.

Extending along the partition 18 in the chamber 26 is a liquid wax vehicle supply pipe 80 from which nipples 81 extend through the holes 74. These nipples are provided on their inner ends with atomizing nozzles 82. As shown in Figs. 3 and 4, the nipples 81 are preferably inclined downwardly from horizontal. The supply pipe 80 is connected with a pump 83 which draws a light, volatile liquid containing a very small quantity of wax in finely divided condition from a tank 84 and constantly forces this liquid into the pipe 80 so as to provide a constant supply of said liquid to the nozzles 82 at a predetermined pressure.

The conduit 27 is open at opposite ends and is adapted to be closed at either of these ends by a cap 90. At its other end the conduit 27 connects with a rotary blower 91, which is driven by an electric motor 92 causing it to withdraw air from the conduit 27 and discharge this upwardly through a stack 93.

The operation of the above described apparatus of the present invention in carrying out the process disclosed in my copending application aforesaid, is as follows:

The tank 84 is furnished with a supply of the solution in a volatile solvent of waxy material with which the fruit is treated in said process. The pump 83 is now set in operation so as to maintain a hydraulic pressure of solution against the valve 95 which is closed. This pressure may vary anywhere from 30 to 125 pounds per square inch with the types of hydraulic atomizing nozzles available for use. The power mechanism 55 and the motor 92 are set in operation so as to cause the upper flights of the conveyors 45 and 56 to travel continuously from the receiving end toward the discharge end of the waxer 1.

The other units of apparatus A are set in operation at the same time and fruit is dumped into the right hand end of the soaking tank 2 in a continuous stream, this fruit thereafter flowing through the line of apparatus A in which it is washed in the washer 4, partially dried in the water eliminator 5, completely dried in the drier 6, waxed in the waxer 1, sorted as to surface characteristics while traveling over the conveyors of the sorting table 7, and finally sized by the sizer 8. Suitable bins under the sizer 8 catch the fruit as these are segregated and the fruit is taken manually from these bins, wrapped, and packed in shipping cases.

When the stream of fruit through the apparatus A reaches the waxer 1, the valve 95 is turned on so as to permit the solution from the tank 84 to be delivered by the pump 83 to the atomizing nozzles 82. From these nozzles the wax solution is delivered in a very fine mist 96 which impinges against the layer of fruit F being carried forwardly over the conveyor 45.

The blower 91 which is driven by the motor 92 constantly maintains a strong draft of air by sucking air into the mouth 30 of the conduit 27 and discharging this air upwardly through the stack 93. The draft set up by this suction enters the housing 12 from beneath the conveyor 56, and after passing upwardly through this conveyor and the chamber 26 it comes in a plurality of currents through the various apertures in the transverse plane of the nozzles 82, and disposed close to, above and below the latter, and carries the mist 96 downwardly with it so that the particles of this mist all have to pass in close proximity to the fruit F, with the inevitable result that by far the greater portion of these particles contact and adhere to this fruit. A certain portion of these particles, of course, is carried downwardly through the conveyor 45 and is exhausted by the blower through the stack 93.

The flow of air produced by the blower 91 performs the triple function of (1) accelerating the evaporation of the solvent from the surfaces of the fruit in the chamber 26, (2) of forcibly impinging the mist 96 onto the fruit on the conveyor 45, and (3) of expediting evaporation of the solvent from the mist particles as they travel toward the fruit. Incidentally, this flow of air discharges the fumes of solvent produced in thus performing the process so as not only to facilitate the ready evaporation of the solvent from the mist particles as these hit the fruit, but at the same time eliminates the possibility of an inflammable gaseous mixture developing.

As the fruit F travels on the conveyor 45 it is not only rotated on its transverse axes by its contact with the cylindrical surfaces of the rollers 51, but the fruit is twisted periodically in this travel by the helical ribs 52, which turn the fruit to change the axes about which it is rotated by the rollers 51. Thus, practically all surfaces of all the pieces of fruit are subjected to the action of the atomized wax solution and receive a uniform application of the solution thereto.

Arriving at the end of the conveyor 45, the fruit is discharged over the drop board 38 onto the conveyor 56 which carries it through the draft of air rising upwardly in the chamber 26, so that the fruit is discharged from the right hand end of the conveyor 56 over the drop board 39 onto the receiving end of the sorting table 7. Thus, immediately after treatment by the apparatus of this invention in carrying out the aforesaid process, the fruit is ready for sorting and then sizing, after which it is, of course, packed in boxes as aforesaid.

In performing said process, the apparatus of the present invention should be so operated that the fruit passing through the waxer 1 has deposited thereon only the desired quantity of the solution of the waxy material in the volatile solvent. In no case should the apparatus be so operated as to apply sufficient of the waxy solution to the fruit as to cause dripping. The placing of an amount of waxy solution on the fruit, which is just less than sufficient to cause the solution to drip from the fruit is the maximum amount which the fruit will stand without its being both burned by the solvent and smothered by the heaviness of the wax coating which is left on the fruit when the solvent evaporates from the solution. However, it is preferable that the apparatus be generally so operated as to apply materially less of the wax solution than that corresponding to the point at which the solution commences to drip from the fruit.

The apparatus of this invention may, with advantage, be used on various fruits in addition to citrus fruits, such as pears, apples, persimmons, green tomatoes, green peppers, potatoes, watermelons, honeydews, casabas, pecans, and walnuts. I have also found the apparatus of the present invention to be particularly valuable for the treatment of cantaloupes.

In Fig. 2, I have illustrated an apparatus B especially adapted for the treatment of cantaloupes. In Fig. 2, the waxer 1 may be in all respects identical with the waxer 1 employed in the apparatus of Fig. 1 of the drawings. The apparatus of Fig. 2 comprises a dumping hopper 100, a trash eliminating elevator 101, a sorting table 102 having a horizontal conveyor belt 103, a dry brusher 104, the waxer 1, and a long packing bin 105, which is provided with a suitable conveyor belt and distributing system for distributing cantaloupes throughout its length, as the latter are received from the waxer 1.

The dry brusher 104 has a series of cylindrical brushes 106 which are rapidly rotated at a speed preferably from 100 to 250 R. P. M., so that their upper surfaces travel in a direction from the receiving towards the discharge end of the brusher. Mounted beneath the brushes 106 is a dirt catching tray 107, while directly above these brushes is a hood 108 from which air is exhausted by a power driven blower 109.

In performing the aforesaid process on cantaloupes with the apparatus shown in Fig. 2, the cantaloupes are dumped into the hopper 100 from the crates in which they come from the field. From this hopper they are elevated by the elevator 101 onto the sorting belt 103. As the melons are carried on this belt, the culls are picked therefrom by workers who stand on a platform 110. The cantaloupes left on the belt 103 are those which come up to shipping standards. These pass into the brusher 104 and are vigorously brushed by the rotating brushes 106 so as to remove dirt adhering to the melons and scrub from the net of the melons the dead matter adhering thereto, as well as to clean out the fuzz-like hairs which grow in the valleys between the net. This leaves the outer surfaces of the cantaloupes brushed clean in readiness for waxing.

The application of the waxy material to the cantaloupes in the waxer 1 is carried out in exactly the same manner and may be carried out by exactly the same character of solvents and waxy material as is described in connection with the treatment of citrus fruit.

The cantaloupes are delivered from the waxer 1 onto the distributing belt of the bin 105 with the surfaces of the cantaloupes waxed but dry and ready to be wrapped and packed in shipping cases.

From the foregoing description, it is believed clear that I have produced in the present invention a novel apparatus of great utility in the treatment of fresh whole fruit to permit the applying of a treating liquid thereto under controlled conditions such as are required in performing the aforesaid process. It is also manifest that said apparatus makes a novel use of atomizing means and means for setting up air currents associated therewith, for applying the finely atomized light treating liquid to said fruit so as to utilize said liquid in the treatment with relatively small wasteage.

Another advantage believed evident from said description is the capacity of said apparatus for applying volatile treating liquid in minute quantities to fruit without substantial wasteage of the treating liquid and without dissipation into the surrounding atmosphere of toxic fumes produced in performing said process.

Another advantage in said apparatus is the utilization of a single air moving means to effect a flow of air accomplishing the removal of the toxic fumes and the control and direction of atomized treating solution, as well as the evaporation of the volatile constituents of said solution from the fruit to permit the particles of solution applied to the latter to remain in situ as so applied while the volatile constituents in said particles are removed by said current of air.

While, for illustrative purposes, a specific embodiment of the present invention is shown in the accompanying drawings and is described hereinabove, it is to be understood that various changes may be made in this without departing from the spirit of the invention or the scope of the appended claims.

What I claim is:

1. An apparatus for treating fresh fruit with a volatile treating liquid, comprising means forming a treating chamber, means forming a drying chamber, means for conveying fruit through said chambers in the order named, said conveying means being provided with openings therein to permit the passage of air therethrough, an air inlet in said drying chamber beneath said conveying means, means above said conveying means for conducting air from said drying chamber into said treating chamber, means for exhausting air from beneath the conveying means in said treating chamber to cause a current of air to flow upwardly through said conveying means in the drying chamber, thence into the treating chamber and downwardly through the said conveying means in the treating chamber, and means for atomizing a volatile treating liquid into said air current after said air has passed through the conveying means in the drying chamber.

2. In an apparatus for treating fresh whole fruit with a volatile liquid treating material, the combination of: housing means forming a treating chamber; means for conveying the fruit through said chamber, said conveying means being provided with spaces therein to permit the passage of air therethrough, there being air opening means formed in said housing a substantial distance above said fruit conveying means for the admission of air into said chamber; means for evacuating air from the space immediately beneath said conveying means to cause a downward flow of air from said chamber through said conveying means and the fruit carried thereon; and means disposed between said conveying means and said air opening means for atomizing said volatile liquid into said chamber in the path of air traveling from said air opening means toward said conveying means.

3. In an apparatus for treating fresh whole fruit with a volatile liquid treating material, the combination of: a housing forming a treating chamber; a conveyor for carrying fruit through said chamber, said conveyor having spaces therein to permit the passage of air downwardly therethrough; means for exhausting air from the space just beneath said conveyor to cause air to be sucked downwardly between fruit carried on said conveyor and through said conveyor, there being an opening in an upper portion of said housing a substantial distance above said fruit, a continuous stream of air being set up by said evacuating means, which stream flows downwardly from said opening against fruit carried on said conveyor; and nozzle means located between said conveyor and said opening for atomizing said liquid and discharging the atomized particles in said liquid into said stream as it travels downwardly against said fruit.

4. In an apparatus for treating fresh whole fruit with a volatile liquid treating material, the combination of: a housing forming a treating chamber; means for conveying the fruit along a given path through said housing; hydraulic pressure nozzle means for atomizing said volatile liquid in a space above the path of the conveyed fruit and discharging said atomized liquid in a stream of misty particles tending to rapidly precipitate from the air, said stream being obliquely inclined relative to the path of said conveyed fruit, said housing being provided with inlet means for the admission of air to the housing at spaced points above and below the point where said atomization occurs; and means for evacuating air from the space beneath the path of the conveyed fruit whereby the air admitted to the housing at said spaced points is caused to flow along paths converging toward said evacuating means and said stream, so that the combined effect of said currents is to entrain therein said misty particles of volatile liquid and deliver them rapidly and forcibly against said fruit.

5. In an apparatus for treating fresh whole fruit with a volatile liquid treating material, the combination of: a housing forming a treating chamber; means for conveying the fruit along a given path through said housing; hydraulic pressure nozzle means for atomizing said volatile liquid in a space above the path of the conveyed fruit and discharging said atomized liquid in a stream of misty particles tending to rapidly precipitate from the air, said stream being obliquely inclined relative to the path of said conveyed fruit, said housing being provided with inlet means for the admission of air to the housing at three points one above said pressure nozzle means, one at said pressure nozzle means, and the other below said pressure nozzle means; and means for evacuating air from the space below the path of the conveyed fruit whereby the air admitted to the housing at said three points is caused to flow in currents toward said evacuating means along paths such that the middle current travels substantially along the stream of said misty particles and said upper and lower currents converge on said stream of particles, said currents thus uniting to entrain therein said misty particles of liquid and deliver them rapidly and forcibly against the fruit being carried on said conveyor.

6. An apparatus for treating fruit comprising: means forming an enclosed treating chamber having an air inlet opening in its upper portion; means disposed below said inlet opening for conveying fruit through said chamber, said conveying means having openings therein to permit the passage of air downwardly therethrough; means for exhausting air from said chamber beneath said conveyor to cause a current of air to flow into said chamber by way of said inlet opening and thence downwardly through the conveying means; and means disposed above said conveying means and in the path of said air current for discharging finely divided particles of treating liquid into the current.

7. In an apparatus for treating fresh whole fruit with a volatile liquid treating material, the combination of: housing means forming a treating chamber; means for conveying the fruit through said chamber, said conveying means being provided with spaces therein to permit the passage of air therethrough, and said housing being provided with inlet means above said conveying means for the admission of air to the housing; means for evacuating air from the space beneath the path of the conveyed fruit whereby the air admitted through said inlet means is caused to flow in a stream downwardly against the fruit on said conveying means and then pass between the pieces of said fruit and downwardly through the openings in said conveying means to the evacuating means; nozzle means for discharging said volatile liquid in atomized form, said nozzle means being located adjacent the path of said stream of air as it enters the housing through said inlet means and positioned to direct the atomized particles of said liquid into said air stream so that the atomized particles of said liquid are entrained in said air stream as they are formed and carried directly downwardly against said pieces of fruit on said conveying means, thereby depositing said particles on said fruit, the flow of said air stream downwardly through the openings in said conveying means continuously evacuating from said chamber the toxic fumes produced by the evaporation of said liquid in said chamber, and aiding in the evaporation of said liquid from said fruit.

JAGAN N. SHARMA.